(12) United States Patent
Iwata

(10) Patent No.: US 8,866,451 B2
(45) Date of Patent: Oct. 21, 2014

(54) POWER SUPPLY APPARATUS

(75) Inventor: Takeshi Iwata, Fukuoka (JP)

(73) Assignee: Ricoh Company, Ltd., Tokyo (JP)

( * ) Notice: Subject to any disclaimer, the term of this patent is extended or adjusted under 35 U.S.C. 154(b) by 275 days.

(21) Appl. No.: 13/590,502

(22) Filed: Aug. 21, 2012

(65) Prior Publication Data

US 2013/0051095 A1 Feb. 28, 2013

(30) Foreign Application Priority Data

Aug. 29, 2011 (JP) ................... 2011-185647

(51) Int. Cl.
G05F 1/656 (2006.01)
G05F 1/613 (2006.01)
H02M 1/42 (2007.01)
H02M 3/158 (2006.01)

(52) U.S. Cl.
CPC .......... *H02M 1/4225* (2013.01); *H02M 3/1584* (2013.01)
USPC ........... 323/222; 323/223; 323/224; 323/282; 323/283; 323/284; 323/285; 323/286

(58) Field of Classification Search
USPC .................................. 323/222–224, 282–286
See application file for complete search history.

(56) References Cited

U.S. PATENT DOCUMENTS

| | | | | |
|---|---|---|---|---|
| 6,046,920 A * | 4/2000 | Cazabat et al. | ............... | 363/136 |
| 7,402,921 B2 * | 7/2008 | Ingemi et al. | ................... | 307/64 |
| 8,228,046 B2 * | 7/2012 | Ingemi et al. | ................. | 323/222 |
| 2003/0218448 A1 * | 11/2003 | Lidak et al. | .................... | 323/222 |
| 2005/0168073 A1 * | 8/2005 | Hjort | .............................. | 307/65 |
| 2008/0061628 A1 * | 3/2008 | Nielsen et al. | ................. | 307/66 |
| 2009/0257258 A1 | 10/2009 | Ayukawa et al. | | |
| 2012/0091982 A1 * | 4/2012 | Colbeck et al. | ............... | 323/282 |

FOREIGN PATENT DOCUMENTS

| | | |
|---|---|---|
| JP | 3469517 | 11/2003 |
| JP | 2007-195282 | 8/2007 |
| JP | 2009-261042 | 11/2009 |
| JP | 2012-010420 | 1/2012 |
| JP | 2012-090423 | 5/2012 |
| WO | 2011/162410 A1 | 12/2011 |

* cited by examiner

*Primary Examiner* — Bao Q Vu
(74) *Attorney, Agent, or Firm* — IPUSA, PLLC

(57) ABSTRACT

A power supply apparatus includes a first power factor correction circuit, a second power factor correction circuit and a control circuit that includes a first switching control unit that outputs a first switching signal for controlling a first switching element of the first power factor correction circuit generated in accordance with a detected result by an output voltage of the first power factor correction circuit and a current flowing through the first switching element, and a second switching control unit that outputs a second switching signal for controlling a second switching element of the second power factor correction circuit generated in accordance with a detected result by an output voltage of the second power factor correction circuit and a current flowing through the second switching element.

9 Claims, 14 Drawing Sheets

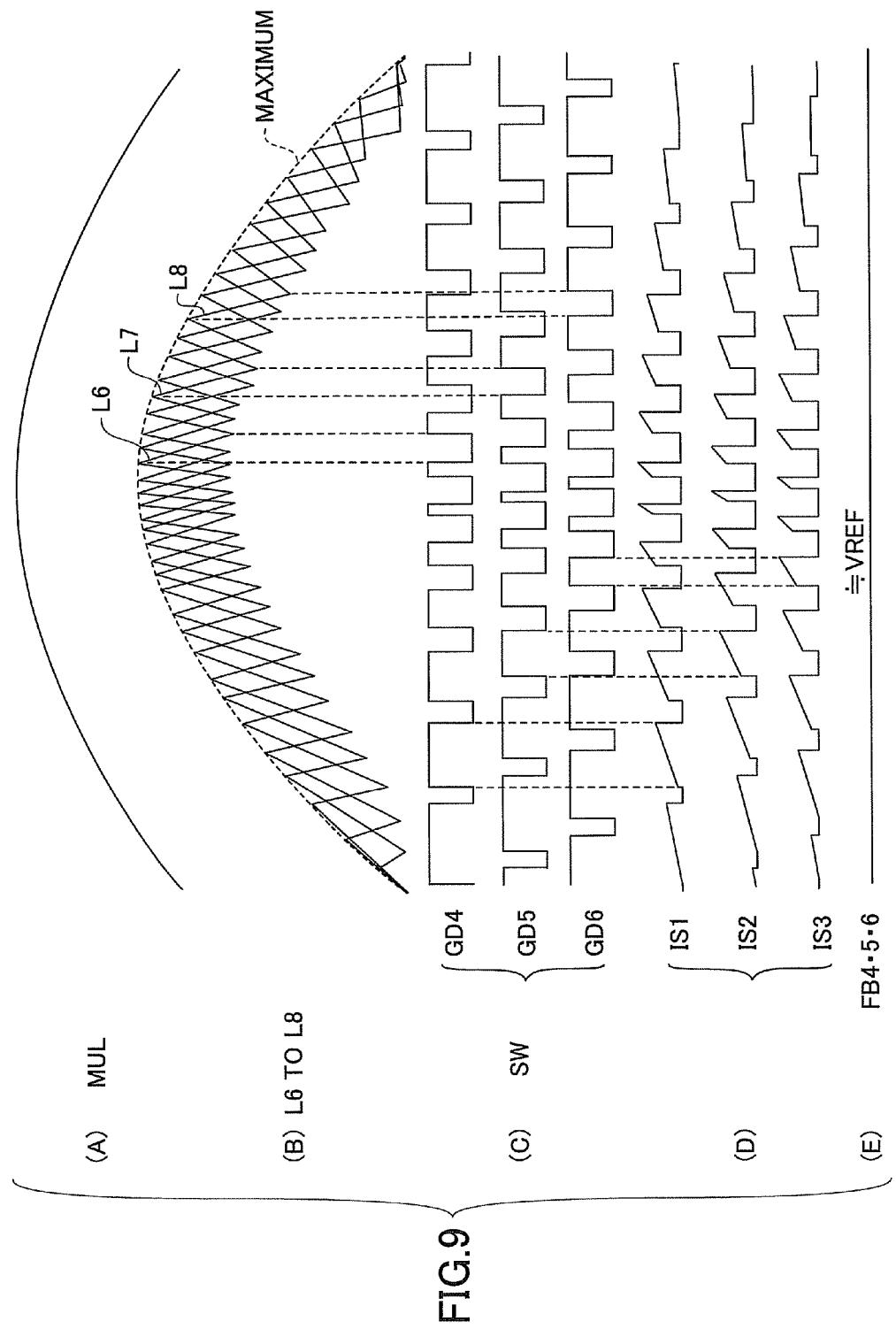

POWER SUPPLY APPARATUS

BACKGROUND OF THE INVENTION

1. Field of the Invention

The present invention relates to a power supply apparatus.

2. Description of the Related Art

Recently, in response to a demand in decreasing power consumption of electric home appliances, business machines or the like, for example, power supply apparatuses are required to have high conversion efficiency. Among the power supply apparatuses, a switching power supply apparatus in which a power factor correction circuit (simply referred to as a "PFC" hereinafter) and an LLC resonant converter (simply referred to as an "LLC" hereinafter) are connected in series has been widely spread because of high conversion efficiency and low noise.

The PFC used for the switching power supply apparatus has a circuit structure including a boost switching converter, and is controlled to vary a switching frequency or ON/OFF duty ratio of a switching element in accordance with an Alternating Current (AC) input voltage waveform input from an AC power supply. For example, the PFC controls to have a waveform of a current flowing through the PFC become sinusoidal at a phase same as that of the sinusoidal AC input voltage waveform with respect to the AC input voltage waveform to improve power-factor (to reduce wattless power).

As an example of the PFC, an interleave PFC which is proposed for high conversion efficiency and low noise is known (see Japanese Laid-open Patent Publication No. 2007-195282, for example).

FIG. 1 is a view showing an example of such an interleave PFC 100. The interleave PFC 100 shown in FIG. 1 includes an AC power supply AC, a rectifier circuit RFY1, resistors R1 to R3, inductor elements L1 and L2, transistors Q1 and Q2 (switching elements), diodes D1 and D2, a capacitor element C1, an output voltage terminal Vout1, and a PFC controller 101.

In other words, the interleave PFC 100 shown in FIG. 1 includes two PFCs. The PFC controller 101 controls the transistors Q1 and Q2 of the two PFCs, respectively. The PFC controller 101 controls (multiphase-control) the transistors Q1 and Q2 of the PFCs by switching signals whose phases are different by 180°. With this structure, current continuously flows, noise can be reduced, and the maximum value of the flowing current is lowered so that low-loss (high conversion efficiency) can be actualized.

In the interleave PFC 100, the current flowing from the AC power supply (the voltage generated at the resistor R1 in FIG. 1) is detected and the current is controlled such that the integral value of the flowing current becomes sinusoidal in accordance with the sinusoidal AC input voltage waveform.

In the method disclosed in Japanese Laid-open Patent Publication No. 2007-195282, a composition of the outputs of the two PFCs is output from the output voltage terminal Vout1 of the interleave PFC 100. Thus, the two PFCs can have almost the same electric characteristics such that the output voltages of the two PFCs become substantially equal and only the phases are different. In such a case, there is no problem in having the ON/OFF duty ratio of the switching signals the same for the two PFCs. Thus, a control signal of one of the PFCs is used as a reference signal and the control signal is used for a control signal of the other PFCs by shifting the phase.

However, for a case when plural PFCs are used but output voltages of the plural PFCs are different, it is necessary to vary the ON/OFF duty ratio of the switching signals for the plural PFCs. In such a case, control is not performed similar to the way as described in Japanese Laid-open Patent Publication No. 2007-195282.

SUMMARY OF THE INVENTION

The present invention is made in light of the above problems, and provides a power supply apparatus which can improve power-factor by multi-phase control even when output voltages of plural power factor correction circuits are different.

According to an embodiment, there is provided a power supply apparatus including a first power factor correction circuit that includes a first switching element, a first output voltage detection unit that detects an output voltage of the first power factor correction circuit, and a first current detection unit that detects a current flowing through the first switching element; a second power factor correction circuit that includes a second switching element; a second output voltage detection unit that detects an output voltage of the second power factor correction circuit, and a second current detection unit that detects a current flowing through the second switching element; and a control circuit that includes a first switching control unit that outputs a first switching signal for controlling the first switching element generated in accordance with a detected result by the first output voltage detection unit and the first current detection unit, and a second switching control unit that outputs a second switching signal for controlling the second switching element generated in accordance with a detected result by the second output voltage detection unit and the second current detection unit, so that the output voltages of the first power factor correction circuit and the second power factor correction circuit are controlled by the first switching element and the second switching element, respectively.

Note that also arbitrary combinations of the above-described constituents, and any exchanges of expressions in the present invention, made among method, device, system and so forth, are valid as embodiments of the present invention.

BRIEF DESCRIPTION OF THE DRAWINGS

Other objects, features and advantages of the present invention will become more apparent from the following detailed description when read in conjunction with the accompanying drawings.

FIG. 9 is a view showing an example of waveforms of signals of an embodiment;

DETAILED DESCRIPTION OF THE PREFERRED EMBODIMENTS

Figure 1:
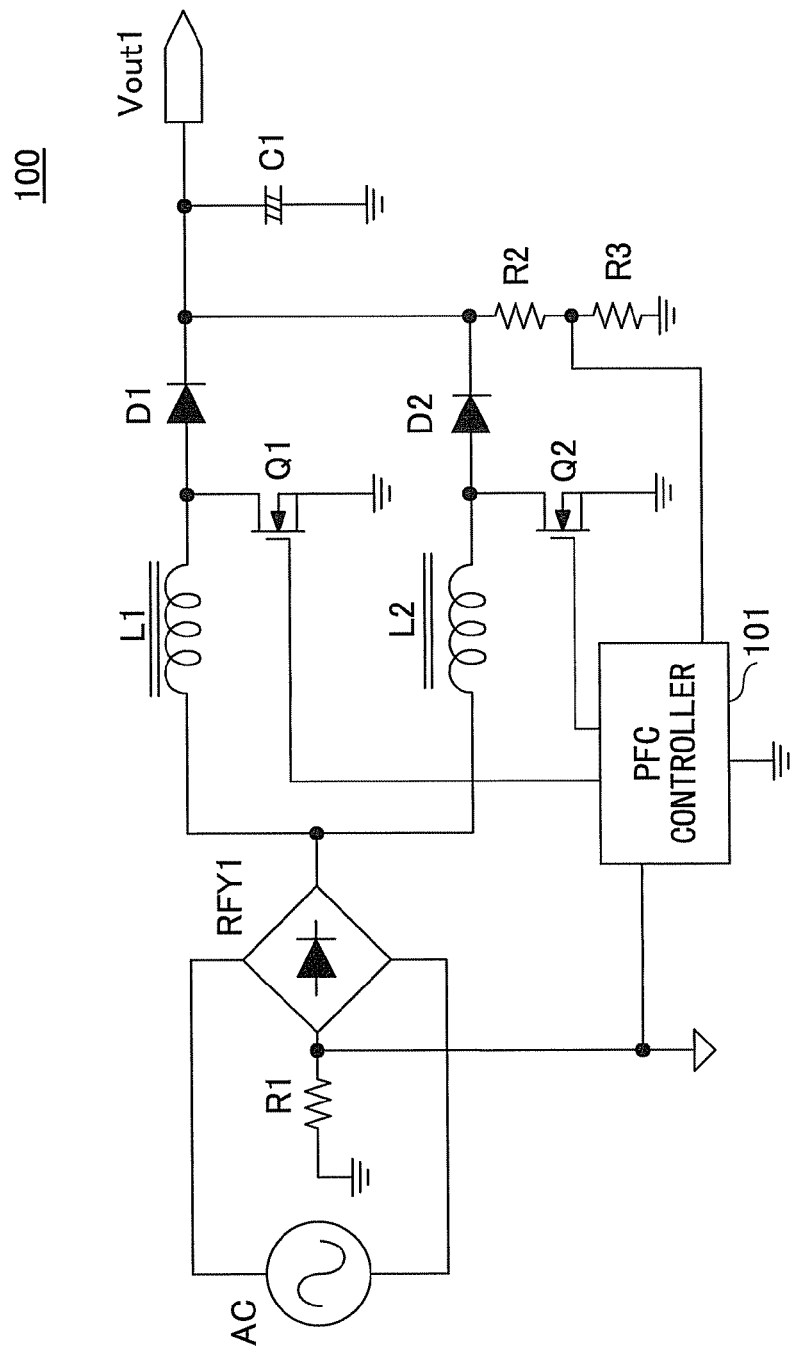
FIG. 1 is a view showing an example of an interleave power factor correction circuit.

The invention will be described herein with reference to illustrative embodiments. Those skilled in the art will recognize that many alternative embodiments can be accomplished using the teachings of the present invention and that the invention is not limited to the embodiments illustrated for explanatory purposes.

It is to be noted that, in the explanation of the drawings, the same components are given the same reference numerals, and explanations are not repeated.

The embodiment relates to a power supply generating technique using an Alternating Current/Direct Current (AC/DC) converter. Further, the embodiment provides a multi-phase power factor correction apparatus in which plural power factor correction circuits (PFCs) are connected in parallel with each other.

(A Technique Related to the Embodiment)

A technique related to the embodiment is explained first.

A multi-phase converter that relates to a multi-phase AC/DC converter including plural switching power supplies connected in parallel with each other has been developed where a PFC and an LLC are connected in series in each of the switching power supplies. In this multi-phase converter, switching timings of the switching power supplies are phase controlled.

In the multi-phase converter, the output voltages of the PFCs are controlled by feedback signals from the LLCs, which are provided downstream of the respective PFCs, such that the output electric power levels of the LLCs become almost equal.

In this multi-phase converter, switching frequencies of the PFCs are set equal while the switching timings of the PFCs are shifted by shifting the phase in accordance with the number of the PFCs. Thus, in order to have the output power levels from the LLCs having different electric characteristics be constant, ON/OFF duty ratio of the switching signals is controlled to be varied when the output voltages of the PFCs are varied.

Further, a power supply apparatus in which a multi-phase control is performed based on the output voltages from the PFCs, has been developed. In this power supply apparatus, among plural PFCs, one of the PFCs is controlled as a master PFC and the rest of the PFCs are controlled as slave PFCs.

Figure 2:
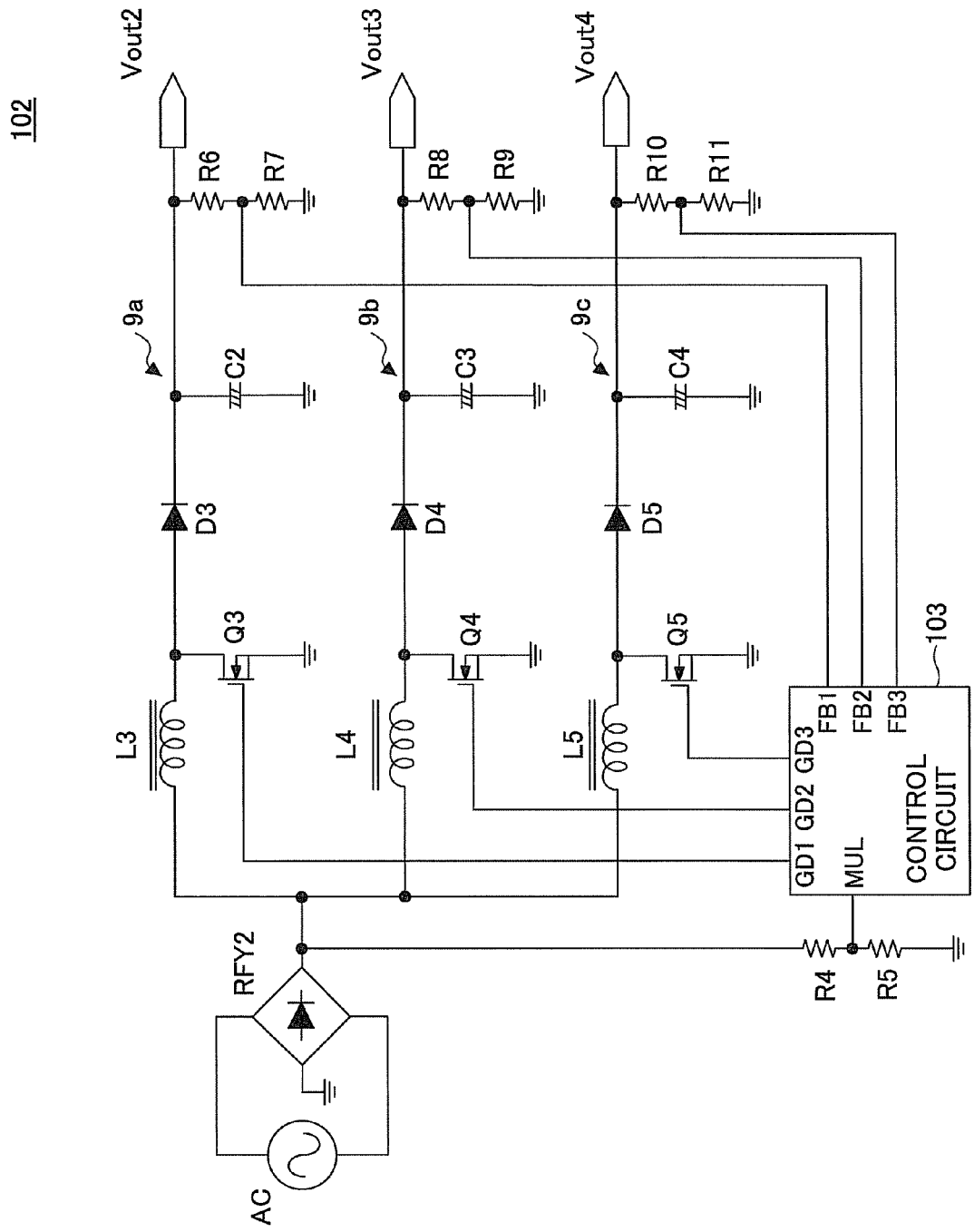
FIG. 2 is a view showing an entirety of a power supply apparatus.
Figure 3:
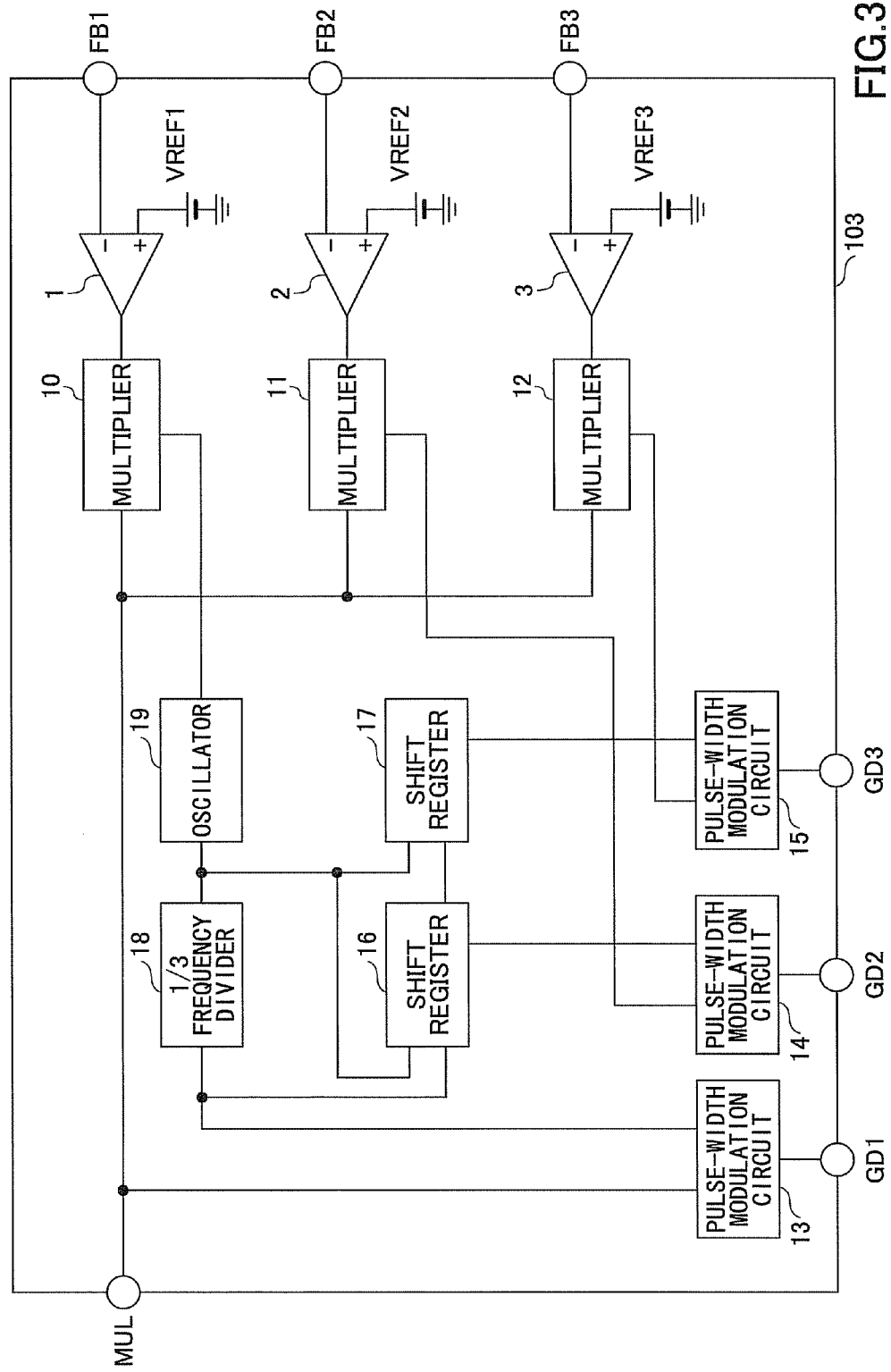
FIG. 3 is a view showing an example of a control circuit that controls a master power factor correction circuit (PFC) and slave PFCs.
Figure 4:
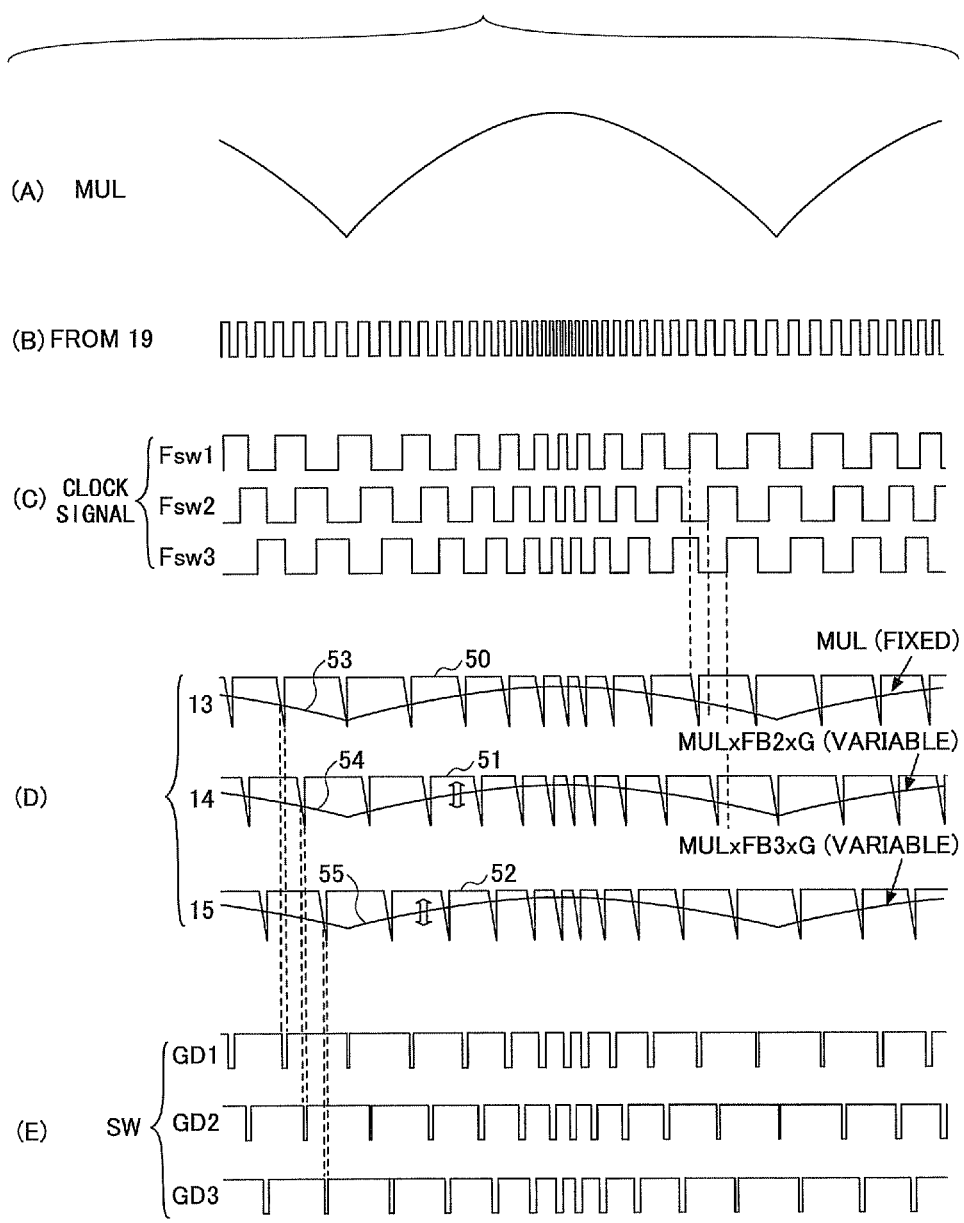
FIG. 4 is a view showing timing charts of the master PFC and the slave PFCs.

FIG. 2 is a view showing an entirety of such a power supply apparatus. FIG. 3 is a view showing an example of a control circuit that controls the master PFC and the slave PFCs. FIG. 4 is a view showing timing charts of the master PFC and the slave PFCs.

The power supply apparatus 102 shown in FIG. 2 includes an AC power supply AC, a rectifier circuit RFY2, inductor elements L3 to L5, transistors Q3 to Q5 (MOSFETs, switching elements), diodes D3 to D5, capacitor elements C2 to C4, resistors R4 to R11, output voltage terminals Vout2 to Vout4, and a control circuit 103.

The power supply apparatus 102 includes three PFCs 9a, 9b and 9c having similar structures with each other. The PFC 9a includes the inductor element L3, the transistor Q3, the diode D3, and the capacitor element C2. Similarly, the PFC 9b includes the inductor element L4, the transistor Q4, the diode D4, and the capacitor element C3. Similarly, the PFC 9c includes the inductor element L5, the transistor Q5, the diode D5 and the capacitor element C4. Here, the PFC 9a functions as a master PFC, and the PFCs 9b and 9c function as slave PFCs.

For the example shown in FIG. 2, the output voltage terminal Vout2 outputs the voltage from the PFC 9a, which is the master PFC, and the output voltage terminals Vout3 and Vout4 output the voltages from the PFCs 9b and 9c, respectively, which are the slave PFCs.

The power supply apparatus 102 is configured to output different voltages from the output voltage terminals Vout2 to Vout4.

Further, as shown in FIG. 3, the control circuit 103 includes a terminal MUL, feedback voltage input terminals FB1 to FB3 for the PFCs 9a to 9c, respectively, output terminals GD1 to GD3 for the PFCs 9a to 9c, respectively, error amplifiers 1 to 3, multipliers 10 to 12, pulse-width modulation circuits 13 to 15, shift registers 16 and 17, a ⅓ frequency divider 18, and an oscillator 19.

For a case shown in FIG. 3, the feedback signal at the feedback voltage input terminal FB1, which is the output voltage of the PFC 9a and the voltage at the MUL terminal, which is the AC input voltage, are multiplied by the multiplier 10, and the multiplied signal is input to the oscillator 19 so that a frequency output from the oscillator 19 is determined. The frequency output from the oscillator 19 becomes a reference frequency of the control circuit 103.

The switching frequency of the PFC 9a is generated by dividing the reference frequency output from the oscillator 19 by three (the number of the PFCs, for example) by the ⅓ frequency divider 18. The ON/OFF duty ratio of the switching signal for the PFC 9a is determined by the pulse-width modulation circuit 13 in accordance with the voltage at the MUL terminal (AC input voltage).

The switching frequencies of the PFCs 9b and 9c are determined to be phase shifted 360°/(the number of the PFCs) from that of the switching signal for the PFC 9a by the shift registers 16 and 17, respectively. The switching signals for the PFCs 9b and 9c are generated as follows. The feedback signals at the feedback voltage input terminals FB2 and FB3, which are the output voltages of the PFCs 9b and 9c, and the voltage at the MUL terminal, which is the AC input voltage, are multiplied by the multipliers 11 and 12, and the multiplied signals are input to the pulse-width modulation circuits 14 and 15, respectively. The ON/OFF duty ratio of the switching signals for the PFCs 9b and 9c are determined by the pulse-width modulation circuits 14 and 15 in accordance with the multiplied signals, respectively.

With the above structure, the power supply apparatus 102 shown in FIG. 2 varies the switching frequency of the PFC 9a (master PFC) in order to maintain the output voltage of the PFC 9a (master PFC) at constant. Further, the power supply apparatus 102 varies the ON/OFF duty ratio of the switching signals in order to maintain the output voltages of the PFCs 9b and 9c at constant value at the switching frequency same as that of the PFC 9a.

Here, the switching signals for the PFC 9a (master PFC) and the PFCs 9b and 9c (slave PFCs) are shown in FIG. 4.

In FIG. 4, a waveform of the voltage at the MUL terminal (AC full rectified waveform) is shown in (A). An output from the oscillator 19 is shown in (B). Clock signals Fsw1 to Fsw3 input to the pulse-width modulation circuits 13 to 15 are respectively shown in (C). In other words, the clock signal Fsw1 shows the clock signal of the master PFC, and the clock signals Fsw2 and Fsw3 show the clock signals of the slave PFCs, respectively.

Two waveforms respectively compared by the pulse-width modulation circuits 13 to 15 are shown in (D). The switching signals SW from the output terminals GD1 to GD3 of the pulse-width modulation circuits 13 to 15 are respectively shown in (E).

As shown in (D), a sawtooth wave 50 having a certain inclination and a waveform 53 of the voltage at the MUL terminal (which has a linear relationship with the AC input voltage waveform) are input to the pulse-width modulation circuit 13. The width of low level (OFF width) of the switching signal SW output from the output terminal GD1 of the pulse-width modulation circuit 13 shown in (E) is determined by the sawtooth wave 50 and the waveform 53 of the voltage at the MUL terminal shown in (D).

The pulse-width modulation circuit 13 outputs a low level signal from the output terminal GD1 when the level of the sawtooth wave 50 is smaller than or equal to that of the waveform 53 of the voltage at the MUL terminal. At this time, the transistor Q3 is switched off by the switching signal SW.

The pulse-width modulation circuit 13 outputs a high level signal from the output terminal GD1 when the level of the sawtooth wave 50 is larger than that of the waveform 53 of the voltage at the MUL terminal. At this time, the transistor Q3 is switched on by the switching signal SW.

As the voltage level at the MUL terminal is fixed with respect to the output voltage of the master PFC, for the master PFC, even when the output voltage is varied in accordance with a load connected to the master PFC, the OFF width of the switching signal from the output terminal GD1 is not influenced. It means that for the master PFC, the frequency of the switching signal is controlled in accordance with the voltage at the MUL terminal such that the output voltage becomes constant.

Further, as shown in (C) of FIG. 4, the frequencies of the clock signals Fsw2 and Fsw3 of the slave PFCs are the same as that of the clock signal Fsw1 of the master PFC.

As shown in (D), sawtooth waves 51 and 52 and signals 54 and 55 are input to the pulse-width modulation circuits 14 and 15, respectively. The sawtooth waves 51 and 52 have the certain inclinations same as that of the sawtooth wave 50 but only phases are different. The signals 54 and 55 are obtained by multiplying the waveform 53 of the voltage at the MUL terminal (which has a linear relationship with the AC input voltage waveform) and the feedback signals at the feedback voltage input terminals FB2 and FB3. The widths of low level (OFF widths) of the switching signals SW output from the output terminals GD2 and GD3 shown in (E) of FIG. 4 are determined by the sawtooth waves 51 and 52 and the signals 54 and 55, respectively.

In other words, for the slave PFCs, the voltage level at the MUL terminal is varied in accordance with the feedback signals at the feedback voltage input terminals FB2 and FB3, and the ON/OFF duty ratio of the switching signals are varied in accordance with the feedback signals at the feedback voltage input terminals FB2 and FB3 with respect to the sawtooth waves 51 and 52, respectively. By varying the ON/OFF duty ratio of the switching signals in accordance with the feedback signals at the feedback voltage input terminals FB2 and FB3, the output voltages are controlled to become constant.

Figure 5A:
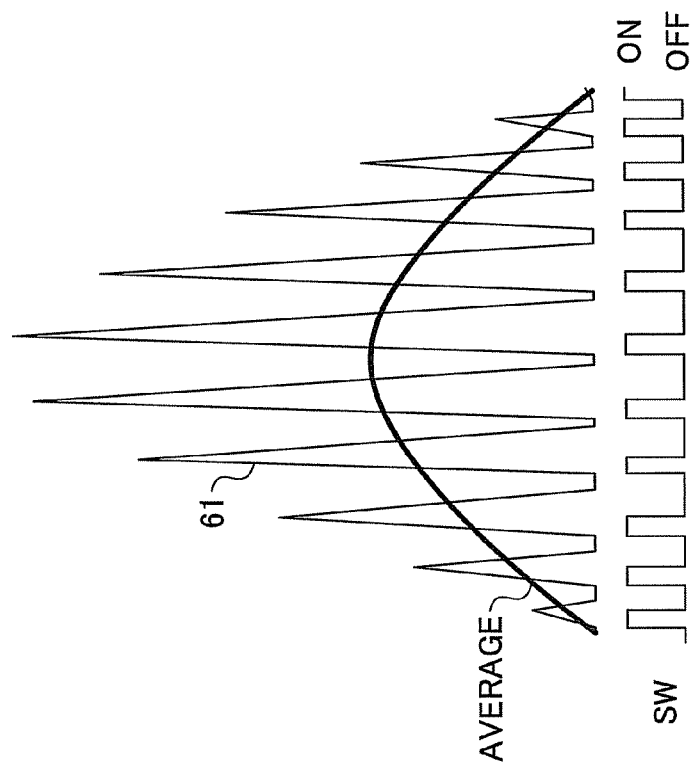
FIG. 5A and FIG. 5B are views for explaining a continuous mode and a discontinuous mode of the PFC, respectively.
Figure 5B:
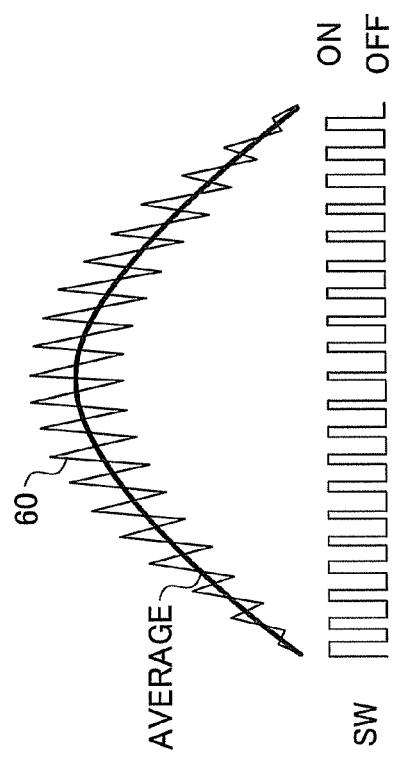

Next, a method of controlling a common PFC (the interleave PFC disclosed in Japanese Laid-open Patent Publication No. 2007-195282, for example) is explained. FIG. 5A and FIG. 5B are views for explaining a continuous mode and a discontinuous mode of the PFC, respectively.

In the common PFC, power-factor is improved by detecting a flowing current, and controlling such that the integrated value of the flowing current becomes sinusoidal in accordance with the AC input voltage. The controlling method includes a method of continuous mode as shown in FIG. 5A and a method of discontinuous mode as shown in FIG. 5B.

For example, in the method of continuous mode shown in FIG. 5A, a next ON cycle starts before a current 60 flowing through the inductor element (coil or the like) of the PFC decreases to be 0 A, when the switching signal is OFF (the switching element is switched off) so that the current 60 increases in the next ON cycle. Thus, even when a small error occurs in the ON/OFF duty ratio of the switching signal, the error is accumulated every cycle so that the integrated value of the flowing current deviates from sinusoidal at a peak. Thus, there is a possibility that power-factor becomes worse.

It means that in the power supply apparatus 102 shown in FIG. 2, the integrated value of the flowing current becomes sinusoidal in accordance with the AC input voltage by controlling the switching frequency and the ON/OFF duty ratio. However, in order to improve power-factor, it is further necessary to accurately determine the ON/OFF duty ratio with respect to the switching frequency.

For the method of discontinuous mode shown in FIG. 5B, errors in the ON/OFF duty ratio are compensated for at the period where the current does not flow, as there is a period where the current does not flow for every cycle. Thus, the above problem does not occur.

In this embodiment, based on the above described technique related to the embodiment, the ON/OFF duty ratio of the switching signals for the PFCs are determined to improve power-factor when the method of continuous mode is used, for example.

Specifically, a detection unit is provided that detects flowing currents flowing through the switching elements of the master PFC and the slave PFCs. Further, by setting the maximum values of the flowing currents based on the feedback signals from the output voltages, and detecting the maximum currents flowing through the switching elements, respectively, the switching elements are controlled to be switched off when the current flowing through the respective switching element reaches the set maximum value.

In this embodiment, the switching frequency of the switching signal is fixed by a signal obtained by multiplying the feedback signal from the output voltage and the AC input voltage. Thus, the OFF period in the switching frequency is determined by subtracting the ON period from a single switching cycle.

(Power Supply Apparatus)

Figure 6:
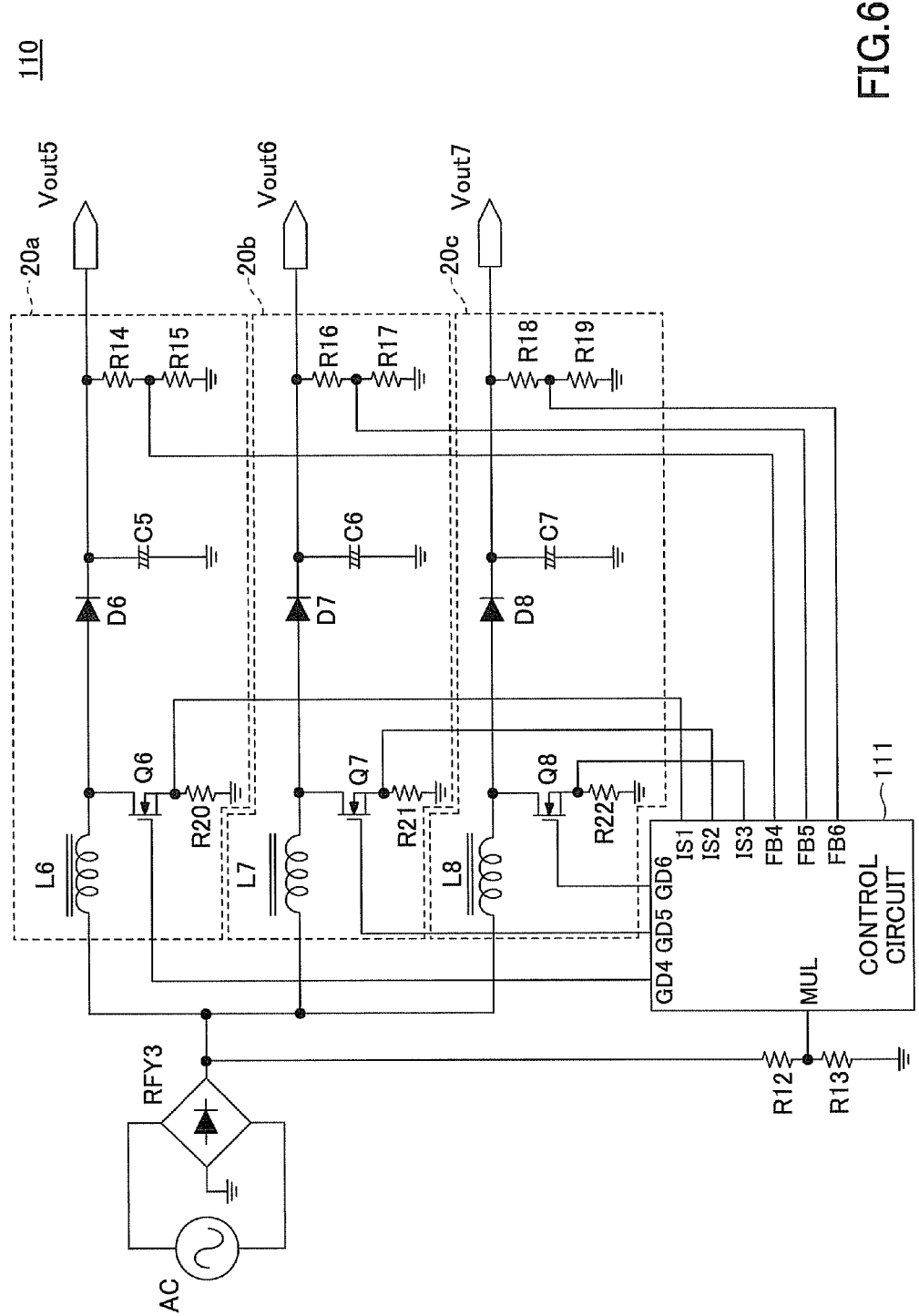
FIG. 6 is a circuit diagram showing an example of a power supply apparatus of an embodiment.

FIG. 6 is a circuit diagram showing an example of a power supply apparatus 110 of the embodiment. The power supply apparatus 110 includes an AC power supply AC, a rectifier circuit RFY3, inductor elements L6 to L8, transistors (switching elements, n-channel MOSFETs, for example) Q6 to Q8, resistors R12 to R22, diodes D6 to D8, capacitor elements C5 to C7, and a control circuit 111.

The power supply apparatus 110 shown in FIG. 6 has a multi-phase PFC structure which outputs plural different voltages. The power supply apparatus 110 includes three PFCs 20a, 20b and 20c having similar structures with each other. The power supply apparatus 110 is configured to output different voltages from output voltage terminals Vout5 to Vout7 of the PFCs 20a, 20b and 20c, respectively.

The PFC 20a includes the inductor element L6, the transistor Q6, the resistor R20, the diode D6, the capacitor element C5 the resistor R14 and the resistor R15. The PFC 20b includes the inductor element L7, the transistor Q7, the resistor R21, the diode D7, the capacitor element C6, the resistor R16 and the resistor R17.

The PFC 20c includes the inductor element L8, the transistor Q8, the resistor R22, the diode D8, and the capacitor element C7 the resistor R18 and the resistor R19. The control circuit 111 includes a MUL terminal, flowing current detection terminals IS1 to IS3, feedback voltage input terminals FB4 to FB6 and output terminals GD4 to GD6.

It is assumed that the PFC 20a is a master PFC (first power factor correction circuit), and the PFC 20b and the PFC 20c are slave PFCs (second power factor correction circuits).

The rectifier circuit RFY3 performs full-wave rectification on AC output from the AC power supply AC.

The resistor R12 and the resistor R13 are connected at ends in series. An output of the rectifier circuit RFY3 is connected to the other end of the resistor R12. The other end of the resistor R13 is connected to a grounded terminal GND. The voltage divided by the resistor R12 and the resistor R13 is connected to the MUL terminal of the control circuit 111. The resistor R12 and the resistor R13 function as an input voltage detection unit.

The output of the rectifier circuit RFY3 is also connected to ends of the inductor elements L6, L7 and L8.

In the PFC 20a (master PFC), the other end of the inductor element L6 is connected to an anode of the diode D6 and a drain of the transistor Q6. A source of the transistor Q6 is connected to an end of the resistor R20 and the flowing current detection terminal IS1 of the control circuit 111. The other end of the resistor R20 is connected to a grounded terminal GND.

A cathode of the diode D6 is connected to the output voltage terminal Vout5. The capacitor element C5 is connected between the output voltage terminal Vout5 and a grounded terminal GND.

The transistor Q6 functions as a switching element and the resistor R20 functions as a current detection unit of the transistor Q6.

Further, the resistor R14 and the resistor R15 are connected at ends in series. The other end of the resistor R14 is connected to the output voltage terminal Vout5 and the other end of the resistor R15 is connected to a grounded terminal GND. The resistor R14 and the resistor R15 function as an output voltage detection unit. The voltage divided by the resistor R14 and the resistor R15 is input to the feedback voltage input terminal FB4 of the control circuit 111.

Similarly, in the PFC 20b or 20c (slave PFC), the other end of the inductor element L7 or L8 is connected to an anode of the diode D7 or D8 and a drain of the transistor Q7 or Q8, respectively. A source of the transistor Q7 or Q8 is connected to an end of the resistor R21 or R22 and the flowing current detection terminal IS2 or IS3 of the control circuit 111, respectively. The other end of the resistor R21 or R22 is connected to a grounded terminal GND, respectively. A cathode of the diode D7 or D8 is connected to the output voltage terminal Vout6 or Vout7, respectively. The capacitor element C6 or C7 is connected between the output voltage terminal Vout6 or Vout7 and a grounded terminal GND, respectively.

The transistor Q7 or Q8 functions as a switching element and the resistor R21 or R22 functions as a current detection unit of the transistor Q7 or Q8, respectively.

Further, the resistor R16 and the resistor R17, or the resistor R18 and the resistor R19 are connected at ends in series, respectively. The other end of the resistor R16 or R18 is connected to the output voltage terminal Vout6 or Vout7 and the other end of the resistor R17 or R19 is connected to a grounded terminal GND, respectively. The resistor R16 and the resistor R17 or the resistor R18 and the resistor R19 function as an output voltage detection unit, respectively.

The voltage divided by the resistor R16 and the resistor R17 is input to the feedback voltage input terminal FB5 of the control circuit 111. The voltage divided by the resistor R18 and the resistor R19 is input to the feedback voltage input terminal FB6 of the control circuit 111.

A gate of the transistor Q6 is connected to the output terminal GD4 of the control circuit 111 such that the transistor Q6 is switched on and off by a switching signal generated in the control circuit 111. A gate of the transistor Q7 is connected to the output terminal GD5 of the control circuit 111 such that the transistor Q7 is switched on and off by a switching signal generated in the control circuit 111. A gate of the transistor Q8 is connected to the output terminal GD6 of the control circuit 111 such that the transistor Q8 is switched on and off by a switching signal generated in the control circuit 111.

The voltages generated in the resistors R20 to R22 are in linear relationship with the flowing currents of the transistor Q6 to Q8, respectively.

The control circuit 111 detects voltages generated in the resistors R20 to R22 by the flowing current detection terminals IS1 to IS3, and uses the detected voltage values to control the ON/OFF duty ratio of the switching signals for the PFCs 20a to 20c.

(Control Circuit 111)

Figure 7:
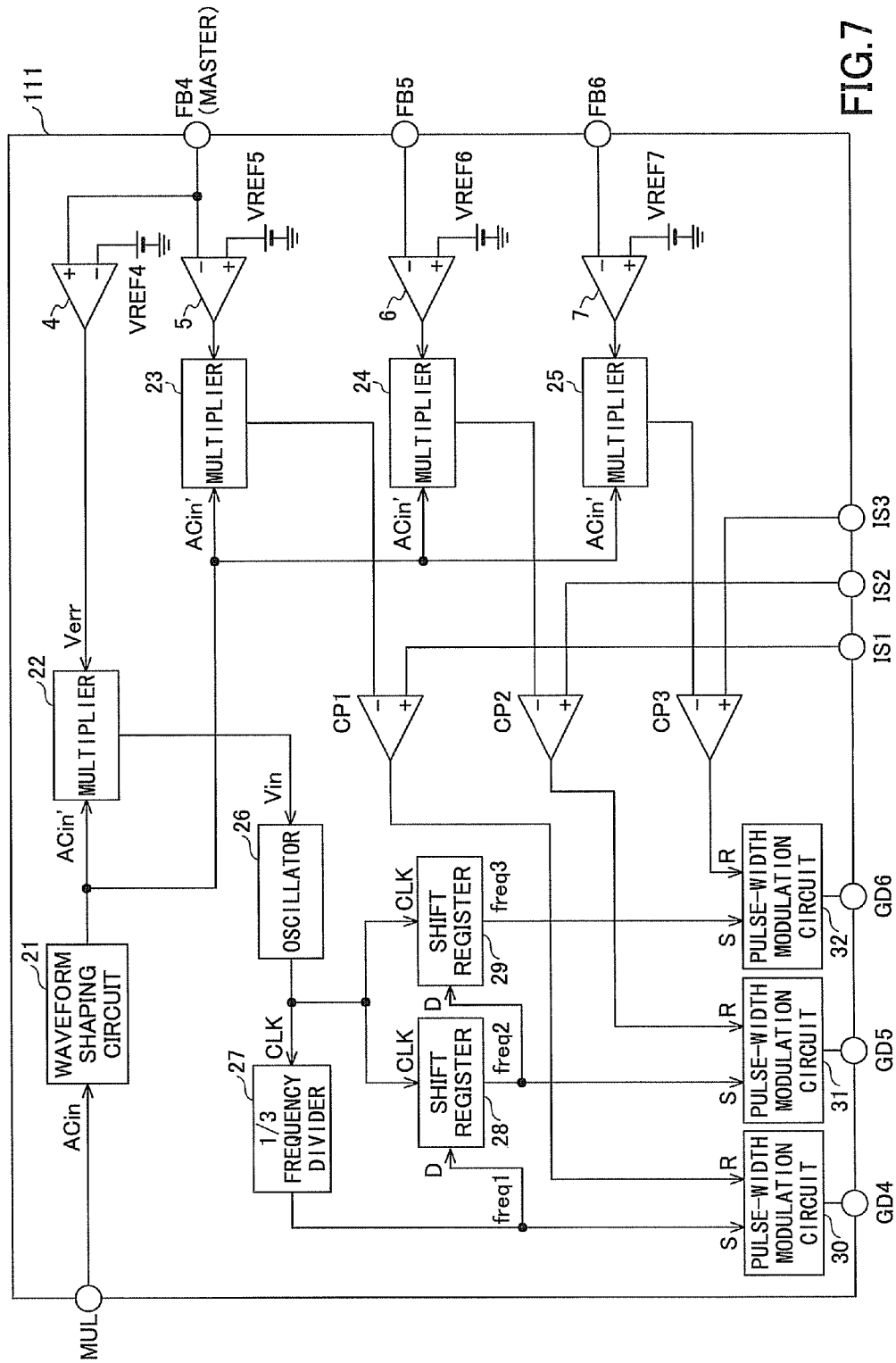
FIG. 7 is a block diagram showing an example of the control circuit shown in FIG. 6.

The control circuit 111 of the power supply apparatus 110 is explained with reference to FIG. 7. FIG. 7 is a block diagram showing an example of the control circuit 111 shown in FIG. 6.

As shown in FIG. 7, the control circuit 111 includes the MUL terminal, the feedback voltage input terminals FB4 to FB6, the flowing current detection terminals IS1 to IS3, the output terminals GD4 to GD6, a waveform shaping circuit 21, multipliers 22 to 25, an oscillator 26, a ⅓ frequency divider 27, shift registers 28 and 29, pulse-width modulation circuits 30 to 32, comparators CP1 to CP3, and error amplifiers 4 to 7. The pulse-width modulation circuits 30 to 32 function as switching control units.

The feedback voltage input terminal FB4 from the PFC 20a (master PFC) is connected to a noninverting input terminal (+) of the error amplifier 4. A reference voltage VREF4 is input to the inverting input terminal (−) of the error amplifier 4.

An output from the error amplifier 4 is input to one of inputs of the multiplier 22. An output from the waveform shaping circuit 21 is input to the other of the inputs of the multiplier 22. The MUL terminal which detects the AC input voltage is connected to an input of the waveform shaping circuit 21.

The oscillator 26 is connected to an output of the multiplier 22. The oscillator 26 outputs a clock signal CLK having a frequency determined in accordance with the output voltage value of the multiplier 22.

The ⅓ frequency divider 27 is connected to an output of the oscillator 26. The clock signal CLK output from the oscillator 26 is also supplied to the shift register 28 and the shift register 29. An output from the ⅓ frequency divider 27 is connected to a set terminal S of the pulse-width modulation circuit 30 and an end (D) of the shift register 28.

The shift register 28 shifts a signal input from the ⅓ frequency divider 27 for 1 clock by the clock signal CLK input from the oscillator 26 and outputs the shifted signal to a set terminal S of the pulse-width modulation circuit 31 and an end (D) of the shift register 29.

Similarly, the shift register 29 shifts the signal input from the shift register 28 for 1 clock by the clock signal CLK input from the oscillator 26 and outputs the shifted signal to a set terminal S of the pulse-width modulation circuit 32.

The pulse-width modulation circuit 30 is set by a rising edge or a falling edge of the pulse signal output from the ⅓ frequency divider 27.

The feedback voltage input terminal FB4 from the PFC 20a (master PFC) is also connected to an inverting input terminal (−) of the error amplifier 5. A reference voltage VREF5 is input to the noninverting input terminal (+) of the error amplifier 5.

An output from the error amplifier 5 is input to one of inputs of the multiplier 23. An output from the waveform shaping circuit 21 is input to the other of the inputs of the multiplier 23. An output from the multiplier 23 is connected to an inverting input terminal (−) of the comparator CP1. The flowing current detection terminal IS1 is connected to a noninverting input terminal (+) of the comparator CP1.

An output from the comparator CP1 is connected to a reset terminal R of the pulse-width modulation circuit 30. The pulse-width modulation circuit 30 is reset by the output from the comparator CP1. As a result, a switching signal having a pulse width (ON width) from timing when the pulse-width modulation circuit 30 is set to timing when the pulse-width modulation circuit 30 is reset is output from the output terminal GD4.

The comparator CP1 outputs a pulse to reset the pulse-width modulation circuit 30 when the output of the flowing current detection terminal IS1 becomes larger than or equal to the output of the multiplier 23 so that the transistor Q6 is switched off.

In other words, the comparator CP1 outputs the pulse when the output of the flowing current detection terminal IS1 becomes equal to the maximum value (upper limit current value) set by a value obtained by multiplying the feedback signal from the output voltage and the voltage at the MUL terminal (AC input voltage) to switch off the transistor Q6. Thus, the transistor Q6 is controlled to be switched off when the maximum value of the flowing current of the transistor Q6 exceeds the upper limit current value.

The feedback voltage input terminal FB5 from the PFC 20b (slave PFC) is connected to an inverting input terminal (−) of the error amplifier 6. A reference voltage VREF6 is input to the noninverting input terminal (+) of the error amplifier 6.

Similarly, the feedback voltage input terminal FB6 from the PFC 20c (slave PFC) is connected to an inverting input terminal (−) of the error amplifier 7. A reference voltage VREF7 is input to the noninverting input terminal (+) of the error amplifier 7.

An output from the error amplifier 6 is input to one of inputs of the multiplier 24. An output from the waveform shaping circuit 21 is input to the other of the inputs of the multiplier 24. An output from the multiplier 24 is connected to an inverting input terminal (−) of the comparator CP2. The flowing current detection terminal IS2 is connected to a noninverting input terminal (+) of the comparator CP2.

An output from the comparator CP2 is connected to a reset terminal R of the pulse-width modulation circuit 31. The pulse-width modulation circuit 31 is reset by the output from the comparator CP2. The pulse-width modulation circuit 31 is set by a rising edge or a falling edge of the pulse signal output from the shift register 28. As a result, a switching signal having a pulse width (ON width) from timing when the pulse-width modulation circuit 31 is set to timing when the pulse-width modulation circuit 31 is reset is output from the output terminal GD5.

Similar to the comparator CP1, the comparator CP2 outputs a pulse when the output of the flowing current detection terminal IS2 becomes larger than or equal to the output of the multiplier 24 to reset the pulse-width modulation circuit 31. Thus, at this timing, the transistor Q7 is switched off.

An output from the error amplifier 7 is input to one of inputs of the multiplier 25. An output from the waveform shaping circuit 21 is input to the other of the inputs of the multiplier 25. An output from the multiplier 25 is connected to an inverting input terminal (−) of the comparator CP3. The flowing current detection terminal IS3 is connected to a noninverting input terminal (+) of the comparator CP3.

An output from the comparator CP3 is connected to a reset terminal R of the pulse-width modulation circuit 32. The pulse-width modulation circuit 32 is reset by the output from the comparator CP3. The pulse-width modulation circuit 32 is set by a rising edge or a falling edge of the pulse signal output from the shift register 29. As a result, a switching signal having a pulse width (ON width) from timing when the pulse-width modulation circuit 32 is set to timing when the pulse-width modulation circuit 32 is reset is output from the output terminal GD6.

Similar to the comparator CP1, the comparator CP3 outputs a pulse when the output of the flowing current detection terminal IS3 becomes larger than the output of the multiplier 25 to reset the pulse-width modulation circuit 32. Thus, at this timing, the transistor Q8 is switched off.

(Waveforms of Signals (Single Phase))

Figure 8:
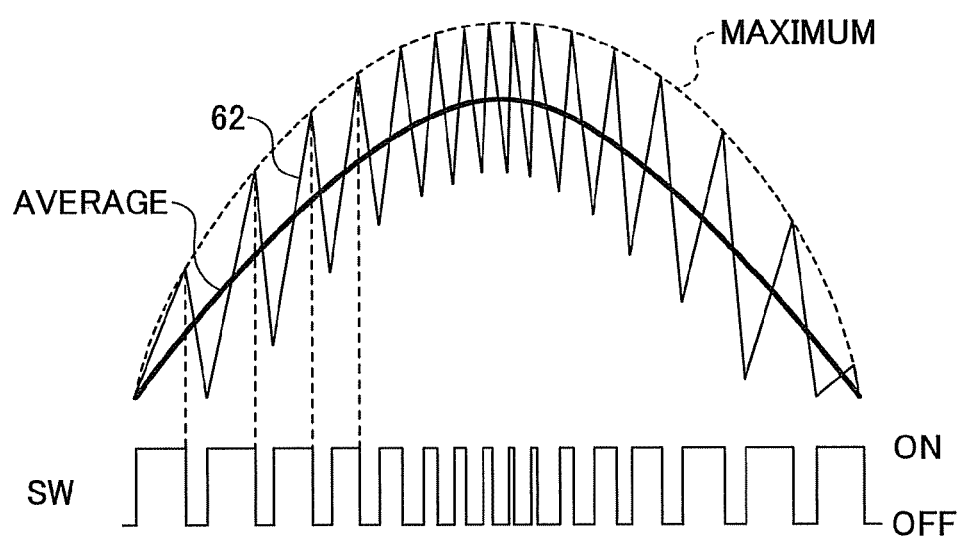
FIG. 8 is a view showing an example of a waveform of a switching signal and a waveform of a flowing current controlled by the control circuit shown in FIG. 7.

With reference to FIG. 8, a waveform of a flowing current which flows through the inductor element L6, L7 or L8 of one of the PFCs 20a to 20c shown in FIG. 6 controlled by the switching signal SW output from the control circuit 111 is explained.

FIG. 8 is a view showing an example of a waveform of a switching signal and a waveform of a flowing current 62 controlled by the control circuit 111 shown in FIG. 7. The waveform of the switching signal SW shown in FIG. 8 expresses a waveform of one of the switching signals to be supplied to one of the transistors Q6 to Q8 controlled by one of the pulse-width modulation circuits 30 to 32 shown in FIG. 7, respectively.

The maximum value (upper limit current value, shown as "MAXIMUM" in FIG. 9) of the flowing current shown in FIG. 8 is set by the voltage applied to the inverting input terminal (−) of the respective comparators CP1 to CP3. For the case shown in FIG. 7, the voltage applied to the inverting input terminal (−) of the respective comparators CP1 to CP3 is set by a value obtained by multiplying the feedback signal from the output voltage (from FB4 to FB6 shown in FIG. 7) and the voltage at the MUL terminal (AC input voltage). The maximum value of the flowing current varies in accordance with the output level from the respective error amplifiers 5 to 7 (the respective output voltages of the PFCs).

According to the embodiment, even when a load varies (when power consumption of a device connected further downstream of the DC voltage output which is downstream of the output voltage terminal Vout varies), the output current is controlled to maintain the DC output voltage constant. For example, for the error amplifier 5, the reference voltage VREF5 is previously set to be VREF5=Vout5×R15/(R14+ R15). The reference voltages VREF6 and VREF7 are similarly set. Further, as gains of the error amplifiers are very large, the output voltage at the FB (which will be referred to as "FB" as well) becomes almost equal to the respective reference voltage (which will be referred to as "VREF" as well) (FB≈VREF).

For example, when a load connected to the output voltage terminal Vout of the respective PFC is large, the current flowing through the load decreases to lower the output voltage output from the output voltage terminal Vout (FB<VREF). At this time, the output voltage of the respective error amplifier becomes high to increase the voltage (upper limit current value) applied to the inverting input terminal (−) of the respective comparator CP.

As a result, the maximum value of the flowing current shown in FIG. 8 increases so that an ON state of the switching signal becomes longer in accordance with the increased current value so that ON state of the switching signal becomes long. Thus, the current flowing through the inductor element (coil or the like) also increases so that the output voltage of the PFC also increases. With this operation, the DC output voltage is controlled to be a constant value.

On the other hand, when the load connected to the output voltage terminal Vout of the respective PFC becomes small, the current flowing through the load increases to higher than the output voltage output from the output voltage terminal Vout (FB>VREF). At this time, the output voltage of the respective error amplifier becomes low to decrease the voltage applied to the inverting input terminal (−) of the comparator.

As a result, the maximum value of the flowing current shown in FIG. 8 decreases so that ON state of the switching signal becomes short in accordance with the decreased current value. Thus, the current flowing through the inductor element (coil or the like) also decreases so that the output voltage of the PFC also decreases. With this operation, the DC output voltage is controlled to be a constant value.

The rising edge of the switching signal shown in FIG. 8 is determined based on the pulse signal output from the ⅓ frequency divider 27. The falling edge of the switching signal shown in FIG. 8 is determined based on the upper limit current value set by the output voltage of each of the PFCs and the AC input voltage.

As described above, according to the control circuit 111, by controlling the upper limit current values of the currents flowing through the PFCs, respectively, in accordance with the load, the average values of the currents flowing through the PFCc can be controlled not to distort from sinusoidal to prevent decrease of power-factor. According to the control circuit 111, by varying the upper limit current value of the flowing current through the PFCs in accordance with the sinusoidal AC input voltage waveform, the switching frequency near AC zero-cross (where the current becomes zero) can be increased to reduce the high frequency noise.

(Waveforms of Signals Controlled by Control Circuit 111)

With reference to FIG. 9, waveforms of switching signals and waveforms of flowing currents flowing through the inductor elements (coil or the like) of three phases controlled by the control circuit 111 shown in FIG. 7 are explained. FIG. 9 is a view showing the switching signals SW and the flowing currents of the three phases controlled by the control circuit 111 shown in FIG. 7.

FIG. 9 is a view showing an example of waveforms of signals. In FIG. 9, a waveform of the voltage at the MUL terminal is shown in (A). Waveforms of the currents flowing through the inductor elements L6 to L8, respectively are shown in (B). Waveforms of the switching signals SW output from the output terminals GD4 to GD6, respectively are shown in (C). Waveforms of the voltages at the flowing current detection terminals IS1 to IS3, respectively are shown in (D). Waveforms of the voltages at the feedback voltage input terminals FB4 to FB6 are shown in (E). As described above, the voltages at the feedback voltage input terminals FB4 to FB6 are almost equal to the reference voltages VREF5 to VREF7, respectively.

As shown by a dotted line in (B), the upper limit current value (the maximum value of the flowing current) of the PFC circuits 20a to 20c is determined by a value obtained by multiplying the voltage at the MUL terminal as shown in (A), and the voltages at the feedback voltage input terminals FB4 to FB6 as shown in (E), respectively.

As shown by the waveforms of the switching signals in (C), the switching signals SW output from the output terminals GD4 to GD6 are controlled to switch off the transistors Q6 to Q8 when the voltages of the flowing current detection terminals IS1 to IS3 shown in (D) exceed the predetermined upper limit current value, respectively.

As described above, the currents flowing through the inductor elements L6 to L8 as shown in (B) are controlled such that peak values do not exceed the upper limit current value and to be a waveform of sinusoidal along that of the upper limit current value.

(Oscillator 26)

Figure 10A:
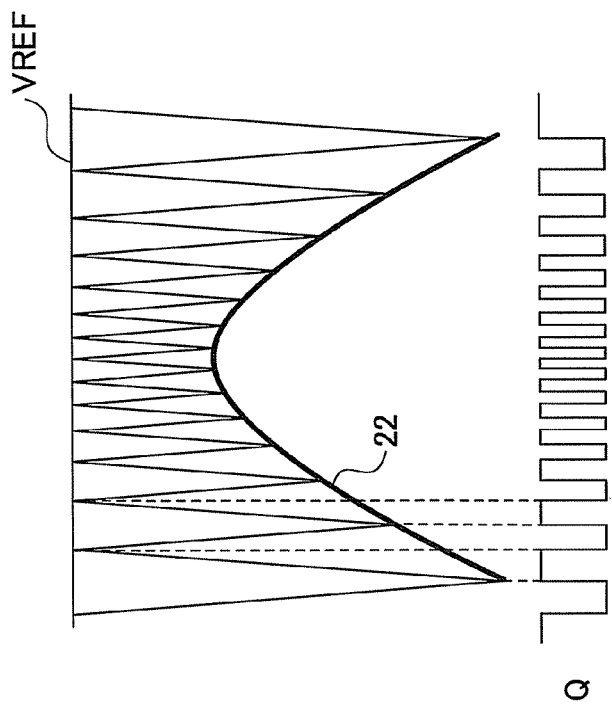
FIG. 10A is a circuit diagram showing an example of an oscillator.
Figure 10B:
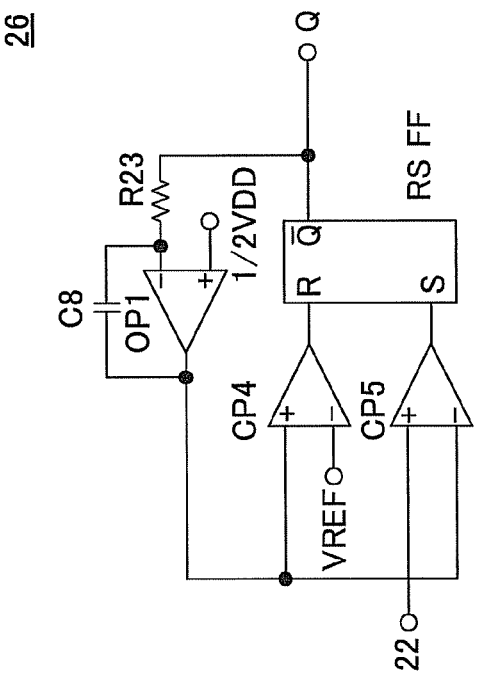
FIG. 10B is a view showing waveforms of signals input to and output from an oscillator.

Referring to FIG. 10A and FIG. 10B, the oscillator 26 shown in FIG. 7 is further explained. FIG. 10A is a circuit diagram showing an example of the oscillator 26. FIG. 10B is a view showing waveforms of signals input to and output from the oscillator 26.

As shown in FIG. 10A, the oscillator 26 includes comparators CP4 and CP5, an RS flip-flop (RSFF), an operational amplifier OP1, a resistor R23, and a capacitor element C8.

The output from the multiplier 22 shown in FIG. 7 is connected to a noninverting input terminal (+) of the comparator CP5. An output terminal of the operational amplifier OP1 is connected to an inverting input terminal (−) of the comparator CP5. The output terminal of the operational amplifier OP1 is also connected to a noninverting input terminal (+) of the comparator CP4. An inverting input terminal (−) of the comparator CP4 is connected to a reference voltage VREF.

The capacitor element 08 is connected between an inverting input terminal (−) and the output terminal of the operational amplifier OP1. The resistor R23 is connected to the inverting input terminal (−) of the operational amplifier OP1. A voltage which is ½ of a power supply voltage VDD, for example, is applied to a noninverting input terminal (+) of the operational amplifier OP1.

With this structure, the operational amplifier OP1 is configured to have a ramp integration circuit with a same inclination in the positive and negative directions. The inclination is determined by the capacitor element C8 and the resistor R23. In the comparator CP4 and the comparator CP5, the output from the operational amplifier OP1, the reference voltage VREF, and the output from the multiplier 22 are compared, and set and reset is alternately performed in the RSFF. With this operation, a reference frequency Q is determined.

For example, as shown in FIG. 10B, when the load connected to the output voltage terminal Vout of the respective PFC becomes large, an output level from the multiplier 22 decreases to slow the reference frequency Q. When the load connected to the output voltage terminal Vout of the respective PFC becomes small, the output level from the multiplier 22 increases to increase the reference frequency Q.

(Waveform Shaping Circuit 21)

Figure 11:
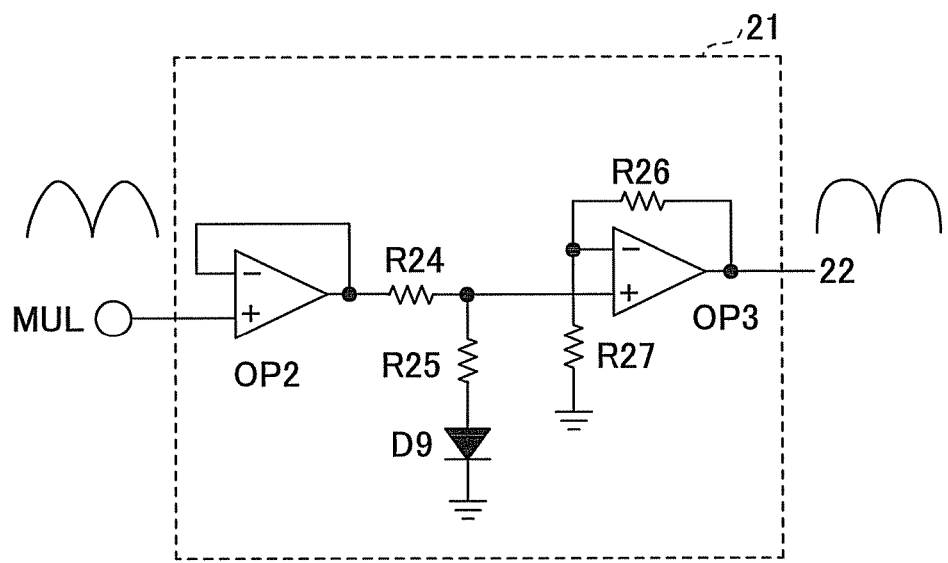
FIG. 11 is a circuit diagram showing an example of a waveform shaping circuit.
Figure 12A:
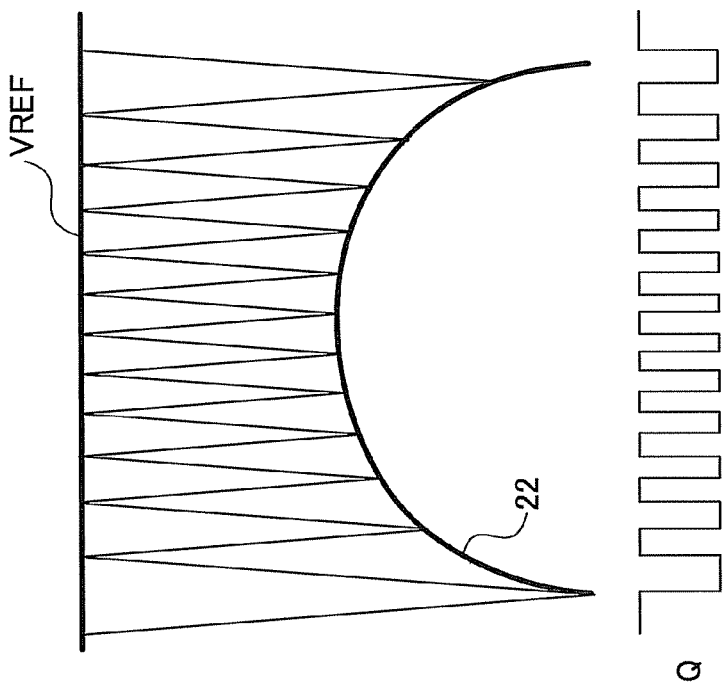
FIG. 12A shows a waveform of an output from a multiplier when AC input voltage is not shaped by the waveform shaping circuit.
Figure 12B:
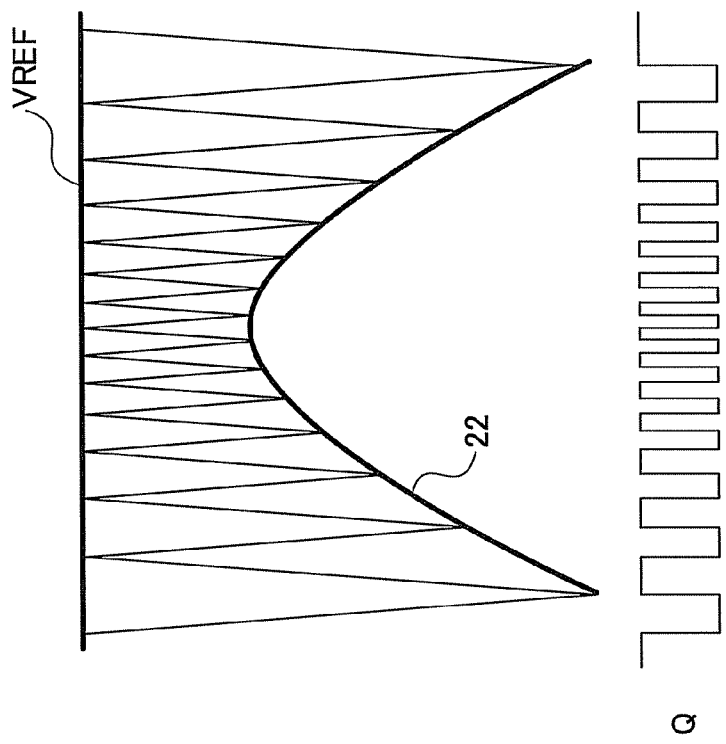
FIG. 12B shows a waveform of an output from a multiplier when AC input voltage is shaped by the waveform shaping circuit.

With reference to FIG. 11, FIG. 12A and FIG. 12B, the waveform shaping circuit 21 shown in FIG. 7 is further explained. FIG. 11 is a circuit diagram showing an example of the waveform shaping circuit 21. FIG. 12A shows a waveform of the output from the multiplier 22 when the voltage at the MUL terminal (AC input voltage) is not shaped by the waveform shaping circuit 21. FIG. 12B shows a waveform of the output from the multiplier 22 when the voltage at the MUL terminal (AC input voltage) is shaped by the waveform shaping circuit 21.

As shown in FIG. 11, the waveform shaping circuit 21 includes operational amplifiers OP2 and OP3, resistors R24 to 27, and a diode 9. The MUL terminal is connected to a noninverting input terminal (+) of the operational amplifier 2, and an output terminal of the operational amplifier 2 is connected to an inverting input terminal (−) of the operational amplifier 2. The operational amplifier 2 is used as a voltage follower.

The output terminal of the operational amplifier 2 is also connected to one end the resistor R24, and the other end of the resistor R24 is connected to one end of the resistor R25 and a noninverting input terminal (+) of the operational amplifier 3. The other end of the resistor R25 is connected to an anode of the diode D9 and the other end of the diode D9 is connected to a grounded terminal GND. An inverting input terminal (−) of the operational amplifier 3 is connected to the resistor R26 and the resistor R27, and the other end of the resistor R27 is connected to a grounded terminal GND.

An output terminal of the operational amplifier 3 is connected to the other end of the resistor R26 so that a positive amplifier is generate by the resistance ratio of the resistor R26 and the resistor R27 to be output to the multiplier 22.

With the above structure of the waveform shaping circuit 21, when the voltage at the MUL terminal (AC full rectified waveform) input from the MUL terminal is less than or equal to VF of the diode D9, a voltage almost the same as that at the MUL terminal is applied to the noninverting input terminal (+) of the operational amplifier 3. On the other hand, when the voltage of the AC full-wave rectification input from the MUL terminal is larger than the VF of the diode D9, the voltage applied to the noninverting input terminal (+) of the operational amplifier 3 becomes a value divided by the resistance ratio of the resistor R24 and the resistor R25 to change dV/dt as a result. With this, the high level part of the AC full rectified waveform can be lowered.

FIG. 12A shows the AC full rectified waveform without shaping by the waveform shaping circuit 21, and FIG. 12B shows the AC full rectified waveform shaped by the waveform shaping circuit 21.

As shown in FIG. 10B, in the oscillator 26, the reference frequency Q is determined by the reference voltage VREF and the output from the multiplier 22. Thus, by comparing the AC full rectified waveform shown in FIG. 12A and the AC full rectified waveform shown in FIG. 12B, the ON widths of the reference frequency determined by the oscillator 26 become constant in the case shown in FIG. 12B where the AC full rectified waveform is shaped by the waveform shaping circuit 21.

As described above, according to the control circuit 111, the switching frequency or the upper limit current value of the flowing currents in the PFCs are capable of being adjusted by the waveform shaping circuit 21, so that the average value of each of the currents flowing through the PFCs can be adjusted to become sinusoidal.

(Another Example of Control Circuit)

Figure 13:
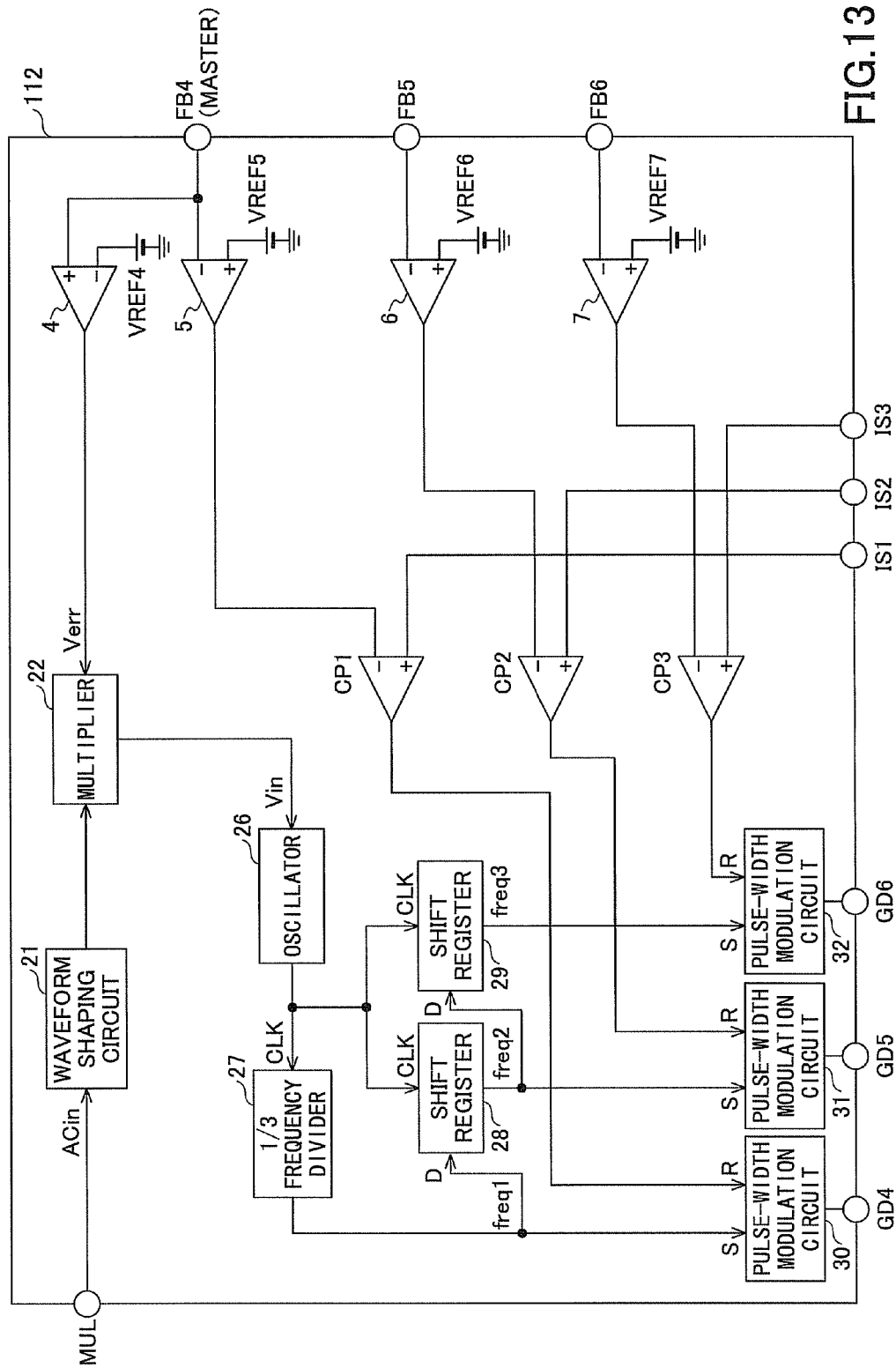
FIG. 13 is a block diagram showing another example of a control circuit of an embodiment.
Figure 14:
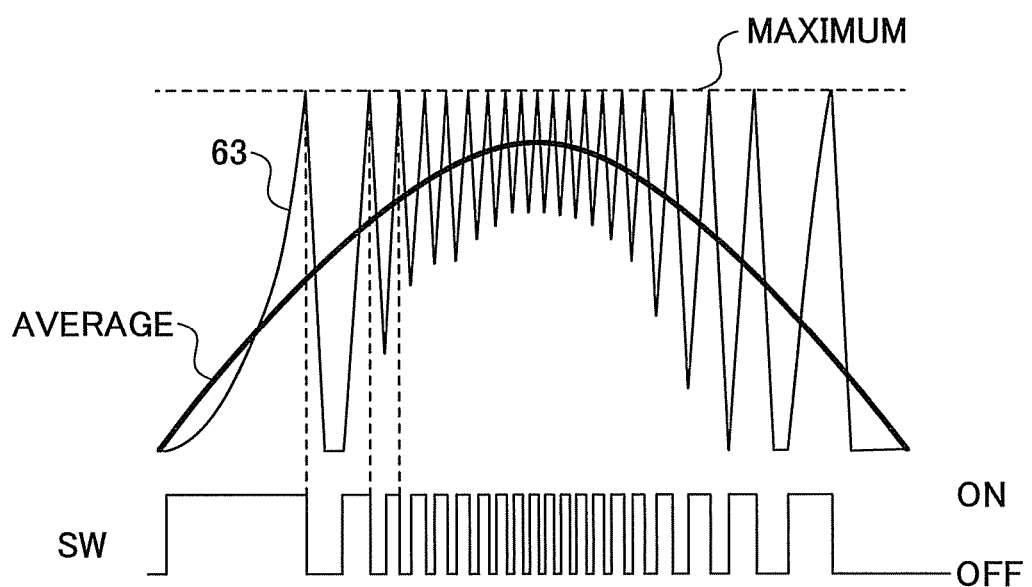
FIG. 14 is a view showing an example of a waveform of a switching signal and a waveform of a flowing current controlled by the control circuit shown in FIG. 13.

Another example of a control circuit included in the power supply apparatus 110 shown in FIG. 6 is explained with reference to FIG. 13 and FIG. 14. FIG. 13 is a block diagram showing another example of a control circuit 112. FIG. 14 is a view showing an example of a waveform of a switching signal and a waveform of a flowing current 63 controlled by the control circuit 112 shown in FIG. 13. In FIG. 13, only one of the flowing currents (single phase) is shown. The control circuit 112 shown in FIG. 13 may be used when high frequency noise is not considered.

The control circuit 112 shown in FIG. 13 includes the MUL terminal, the feedback voltage input terminals FB4 to FB6, the flowing current detection terminals IS1 to IS3, the output terminals GD4 to GD6, the waveform shaping circuit 21, the multiplier 22, the oscillator 26, the ⅓ frequency divider 27, the shift registers 28 to 29, the pulse-width modulation circuits 30 to 32, the comparators CP1 to CP3, and the error amplifiers 4 to 7.

The control circuit 112 is different from the control circuit 111 shown in FIG. 7 that the multipliers 23 to 25 to which the output from the waveform shaping circuit 21 and outputs from the error amplifiers 5 to 7 are respectively input, are not included. Thus, in the control circuit 112, the outputs from the error amplifiers 5 to 7 are directly input to the inverting input terminals (−) of the comparators CP1 to CP3, respectively.

The voltages applied to the inverting input terminals (−) of the comparators CP1 to CP3 set the maximum value of the flowing current (upper limit current value) flowing through the inductor elements L6 to L8, respectively.

As shown in FIG. 14, the maximum value of the flowing current set in the control circuit 112 is different from the maximum value of the flowing current shown in FIG. 8. In this example, the maximum values of the flowing current are set by the output levels from the error amplifiers 5 to 7, in other words, the output voltages of the PFCs, respectively, regardless of the voltage at the MUL terminal (AC input voltage). Similar to the maximum value of the flowing current shown in FIG. 8, the maximum value of the flowing current shown in FIG. 14 increases when the load connected to the output voltage terminal Vout of the respective PFC is large, and decreases when the load connected to the output voltage terminal Vout of the respective PFC becomes small.

The switching signal SW (output from the output terminals GD4 to GD6, for example) shown in FIG. 14 controls to switch off the transistors Q6 to Q8, respectively, when the flowing current through the respective inductor element (coil or the like) of the PFC (the voltage value at the flowing current detection terminal IS) becomes larger than or equal to the set upper limit current value. With this operation, a peak current flowing through the inductor elements L6 to L8 is controlled not to exceed the respective upper limit current values, respectively.

As described above, in the control circuit 112, the falling edges of the switching signals of the master PFC and the slave PFCs are controlled by the upper limit current values previously set in accordance with the output voltages of the PFCs.

As described above, according to the control circuit 112, by controlling the upper limit current values of the currents flowing through the PFCs, respectively, in accordance with the load, the average values of the currents flowing through the PFCc can be controlled not to distort from sinusoidal to prevent decrease of power-factor.

In the above embodiment, while a multi-phase PFC of three phases is explained, the number of the phases is not limited and the power supply apparatus 110 may have two PFCs (a master PCF and a slave PFC), or plural PFCs more than or equal to 4 by increasing the number of frequency dividers, the shift registers, the slave PFCs or the like.

As described above, according to the embodiment, even when the output voltages of the plural PFCs are different, the power-factor can be improved by a multi-phase control.

Although a preferred embodiment of the power supply apparatus has been specifically illustrated and described, it is to be understood that minor modifications may be made therein without departing from the spirit and scope of the invention as defined by the claims.

The present invention is not limited to the specifically disclosed embodiments, and variations and modifications may be made without departing from the scope of the present invention.

The present application is based on Japanese Priority Application No. 2011-185647 filed on Aug. 29, 2011, the entire contents of which are hereby incorporated herein by reference.

What is claimed is:

1. A power supply apparatus comprising:
a first power factor correction circuit that includes
a first switching element,
a first output voltage detection unit that detects an output voltage of the first power factor correction circuit, and
a first current detection unit that detects a current flowing through the first switching element;
a second power factor correction circuit that includes
a second switching element;
a second output voltage detection unit that detects an output voltage of the second power factor correction circuit, and
a second current detection unit that detects a current flowing through the second switching element; and
a control circuit that includes
a first switching control unit that outputs a first switching signal for controlling the first switching element generated in accordance with a detected result by the first output voltage detection unit and the first current detection unit, and
a second switching, control unit that outputs a second switching signal for controlling the second switching element generated in accordance with a detected result by the second output voltage detection unit and the second current detection unit, so that the output voltages of the first power factor correction circuit and the second power factor correction circuit are controlled by the first switching element and the second switching element, respectively.

2. The power supply apparatus according to claim 1, wherein the control circuit is configured to control the maximum currents flowing through the first switching element and the second switching element in accordance with the output voltages detected by the first output voltage detection unit and the second output voltage detection unit, respectively.

3. The power supply apparatus according to claim 1, wherein the control circuit is configured to control switching frequencies of the first switching signal and the second switching signal in accordance with the output voltage detected by the first output voltage detection unit.

4. The power supply apparatus according to claim 1, wherein the first switching control unit is configured to control timing of a rising edge of the first switching signal based on the switching frequency, and
the second switching control unit is configured to control timing of a rising edge of the second switching signal based on the switching frequency.

5. The power supply apparatus according to claim 4, wherein the first switching control unit is configured to control timing of a falling edge of the first switching signal based on the first output voltage detected by the first output voltage detection unit and a current value detected by the first current detection unit, and
the second switching control unit is configured to control timing of a falling edge of the second switching signal based on the second output voltage detected by the second output voltage detection unit and a current value detected by the second current detection unit.

6. The power supply apparatus according to claim 5, further comprising:
an input voltage detection unit that detects an input voltage obtained by a rectifier circuit of an alternating-current power supply,
wherein the first switching control unit is configured to control the timing of the falling edge of the first switching signal based on a signal obtained by multiplying the input voltage detected by the input voltage detection unit and the output voltage detected by the first output voltage detection unit and the current value detected by the first current detection unit, and
the second switching control unit is configured to control the timing of the falling edge of the second switching signal based on a signal obtained by multiplying the input voltage detected by the input voltage detection unit and the output voltage detected by the second output voltage detection unit and the current value detected by the second current detection unit.

7. The power supply apparatus according to claim 1, further comprising:
an input voltage detection unit that detects an input voltage obtained by a rectifier circuit of an alternating-current power supply,
wherein the control circuit further includes a waveform shaping circuit that adjusts to lower a high level part of the input voltage waveform detected at the input voltage detection unit.

8. The power supply apparatus according to claim 1, wherein the first switching control unit is configured to output the first switching signal such that the first switching element is switched off when the maximum current flowing through the first switching element reaches a first set upper limit current value determined in accordance with the output voltage detected by the first output voltage detection unit, and
the second switching control unit is configured to output the second switching signal such that the second switching element is switched off when the maximum current flowing through the second switching element reaches a second set upper limit current value determined in accordance with the output voltage detected by the second output voltage detection unit.

9. The power supply apparatus according to claim 8, further comprising:
an input voltage detection unit that detects an input voltage obtained by a rectifier circuit of an alternating-current power supply, wherein the first set upper limit current value is determined based on a signal obtained by multiplying the input voltage detected by the input voltage detection unit and the output voltage detected by the first output voltage detection unit, and the second set upper limit current value is determined based on a signal obtained by multiplying the input voltage detected by the input voltage detection unit and the output voltage detected by the second output voltage detection unit.

\* \* \* \* \*